United States Patent
Gaddam et al.

(10) Patent No.: US 8,732,810 B2
(45) Date of Patent: May 20, 2014

(54) IP PUSH PLATFORM AND CONNECTION PROTOCOL IN A PUSH NOTIFICATION FRAMEWORK

(75) Inventors: Venkat Gaddam, Bridgewater, NJ (US); Shahid Ahmed, Monmouth Junction, NJ (US); Sankar Shanmugam, Dayton, NJ (US); SM Masudur Rahman, Edison, NJ (US); William Cory Hawkins, Woodstock, GA (US)

(73) Assignee: Cellco Partnership, Basking Ridge, NJ (US)

( * ) Notice: Subject to any disclaimer, the term of this patent is extended or adjusted under 35 U.S.C. 154(b) by 144 days.

(21) Appl. No.: 13/283,440

(22) Filed: Oct. 27, 2011

(65) Prior Publication Data

US 2013/0111572 A1    May 2, 2013

(51) Int. Cl.
*H04L 29/06*    (2006.01)
*H04L 29/08*    (2006.01)
*H04L 9/32*    (2006.01)
*H04W 12/06*    (2009.01)
*G06F 21/14*    (2013.01)
*H04L 29/12*    (2006.01)
*H04L 12/56*    (2006.01)

(52) U.S. Cl.
CPC ............... *H04L 67/26* (2013.01); *H04L 67/145* (2013.01); *H04L 29/06176* (2013.01); *H04L 29/06095* (2013.01); *H04L 29/06551* (2013.01); *H04L 29/12245* (2013.01); *H04L 9/32* (2013.01); *H04L 9/3226* (2013.01); *H04L 63/08* (2013.01); *H04L 63/083* (2013.01); *H04L 63/00* (2013.01); *H04L 47/2416* (2013.01); *H04L 65/00* (2013.01); *H04W 12/06* (2013.01); *G06F 21/14* (2013.01)

USPC ............... 726/7; 726/1; 726/2; 726/3; 726/4; 726/5; 726/8; 726/9; 726/14; 726/15; 726/21; 726/26; 726/27; 726/30; 713/150; 713/151; 713/152; 713/168; 713/182; 713/183; 713/184; 713/185; 713/186; 709/219; 709/225; 709/226; 709/230; 709/231; 709/232

(58) Field of Classification Search
CPC . H04L 67/26; H04L 67/145; H04L 29/08162; H04L 29/12245; H04L 29/06108; H04L 29/06551; H04L 29/06176; H04L 43/10; H04L 9/32; H04L 9/00; H04L 61/203; H04L 63/08; H04L 63/10; H04L 63/00; H04L 63/0272; H04L 2463/082; H04L 69/162; H04L 12/1895; H04L 47/2416; H04L 51/04; H04L 65/00; H04L 65/10; G06F 21/03; G06F 21/04; G06F 2211/003; H04W 12/00; H04W 12/06
USPC .............. 726/1–15, 21, 26–30; 713/150–161, 713/164–186; 380/255–258, 270–37; 709/217–237
See application file for complete search history.

(56) References Cited

U.S. PATENT DOCUMENTS

| | | | |
|---|---|---|---|
| 6,886,169 B2* | 4/2005 | Wei | 719/316 |
| 7,386,610 B1* | 6/2008 | Vekiarides | 709/224 |
| 2005/0136884 A1* | 6/2005 | Reidelsturz et al. | 455/403 |
| 2005/0210511 A1* | 9/2005 | Pettinato | 725/61 |
| 2006/0019749 A1* | 1/2006 | Merati et al. | 463/42 |
| 2007/0210938 A1* | 9/2007 | Deurwaarder et al. | 340/995.21 |
| 2010/0023633 A1* | 1/2010 | Fu et al. | 709/231 |
| 2012/0016775 A1* | 1/2012 | Ramos | 705/27.1 |
| 2012/0110329 A1* | 5/2012 | Brown et al. | 713/168 |

OTHER PUBLICATIONS

Low Latency Live Video Streaming Using HTTP Chunked Encoding by Swaminathan et al; Publisher: IEEE; Date: Oct. 19, 2011.*
U. S. Appl. No. 13/163,240, filed Jun. 17, 2011.

* cited by examiner

*Primary Examiner* — Madhuri Herzog

(57) ABSTRACT

A persistent connection is used for real-time or near real-time data transfer from a push platform on a network to a mobile station. To establish and maintain the persistent connection between the mobile station and push platform on the network, various protocols are defined over a packet connection between the mobile station and push platform. The real-time or near real-time data is pushed or sent by the push platform to the mobile station, as the data becomes available from a data source. In particular, heartbeat messages are used to determine whether or not the persistent connection is alive and available for real-time or near real-time data transfer. When the persistent connection is lost, the mobile station uses a retry connection scheme based on the number of connection attempts made by the mobile station for establishing a new persistent connection to the push platform.

20 Claims, 9 Drawing Sheets

Table 1: Backoff Retry Algorithm

| K (number of connection attempts by mobile station) | T (waiting time before retry) |
|---|---|
| K = 0 | T is 5 seconds. |
| K = 1 | T is a randomly selected number in a range from 5 seconds to 60 seconds. |
| K >= 2 and K < 6 | T is a random number selected from a range from ($2^{K-2}*60$) to ($2^{K-1}*60$):<br>K = 2: T is randomly selected from 60 to 120 seconds.<br>K = 3: T is randomly selected from 120 to 240 seconds.<br>K = 4: T is randomly selected from 240 to 480 seconds.<br>K = 5: T is randomly selected from 480 to 960 seconds. |
| K = 6 | Mobile station stops connection attempts to a network, and K is reset to 0. The mobile station retries later when the mobile station's network connection or the mobile station itself is switched off and back on. |

*FIG. 7*

IP PUSH PLATFORM AND CONNECTION PROTOCOL IN A PUSH NOTIFICATION FRAMEWORK

BACKGROUND

In recent years, mobile communication services have expanded and increased in popularity around the world. Many advanced networks offer various wireless mobile communication services for voice calls and data communications. The data communications services, for example, enable surfing the world wide web via a browser on a mobile station and receiving various data (including real-time data) from remote servers. Further, more and more applications on mobile stations require frequent updates of real-time data from various information servers, for example, to communicate various notification messages.

Many applications on mobile stations use existing polling techniques to obtain data periodically from remote servers. For example, mail client applications running on a mobile station connect to a mail server frequently to check for new mails and fetch data ("polling") if new mail messages are present. However, the polling techniques have drawbacks, especially on mobile stations. For example, frequent polling shortens battery life. When a polling technique is used, a mobile station's radio draws a significant amount of battery power for several seconds for each attempted retrieval of data from a remote server, regardless of whether the data provided by the remote server has changed or not. The polling technique also consumes scarce network bandwidth by frequently checking for new information that may or may not be available. Another disadvantage of the polling technique is that updating real-time data is not practically possible, because the polling technique is used only at predetermined periodic intervals, not in real-time. Hence, the data may not be current. Further, the polling technique uses potentially complex logic to find out what data were modified and can result in an overwhelming load on the remote server (e.g., when a large number of mobile stations poll the remoter server nearly at the same time).

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 7 shows an exemplary retry algorithm for making connection attempts by a mobile station.

DETAILED DESCRIPTION

Figure 1:
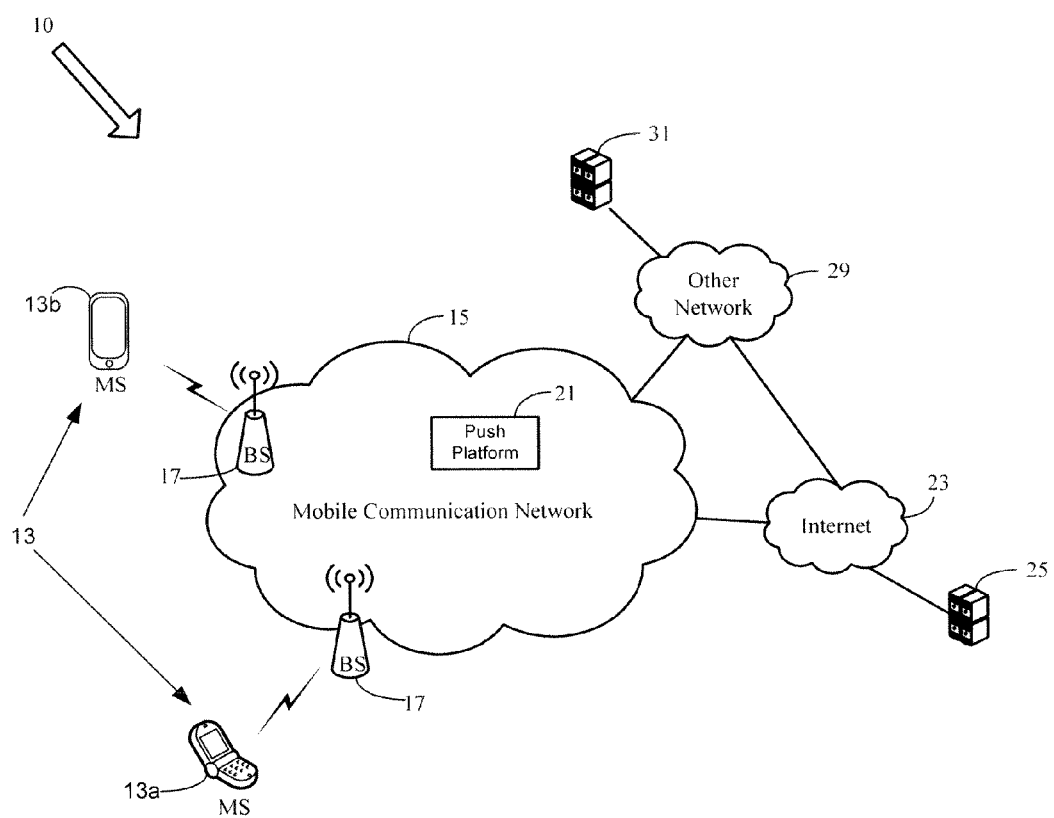
FIG. 1 is a high-level functional block diagram of an exemplary system of networks/devices that provide various communications for mobile stations and support an exemplary technique for push technology.

In the following detailed description, numerous specific details are set forth by way of examples in order to provide a thorough understanding of the relevant teachings. However, it should be appreciated that the present teachings may be practiced without such details. In other instances, well known methods, procedures, components, and/or circuitry have been described at a relatively high-level, without detail, in order to avoid unnecessarily obscuring aspects of the present teachings.

"Push technology" can be implemented to resolve, among other things, some of the problems that the polling technique exhibits, e.g., to reduce battery drain, provide high availability and accuracy of real-time data. The push technology delivers information to a mobile station only when new information becomes available, and the delivery of the information is initiated by a server, e.g., an information server, on a network rather than a mobile station. That is, once a connection is established between the mobile station and the server on the network, data is "pushed" from the information server to the mobile station as it becomes available in real or near-real time. The data communication between the mobile station and the information server is maintained or kept active to allow a push of data when needed, therefore the ongoing data session is sometimes called a "persistent connection." In this nomenclature, "connection" refers to a logical communication session through the network not necessarily a physical or electrical connection. Because the "connection" is persistent (i.e., the same logical connection is used for multiple communication messages), the mobile station does not need to constantly poll the network for new data. Instead, the mobile station can simply wait for new information to be delivered by the information server.

However, there are challenges in implementing the push technology, such as maintaining a persistent connection between a mobile station and an information server on a network. The technologies disclosed below provide effective techniques to maintain the persistent connection between the mobile station and the information server, for example.

An exemplary method for establishing and maintaining a persistent connection includes establishing a packet connection with a mobile station using a secure protocol over a mobile communication network. After establishing the packet connection with the mobile station using the secure protocol (e.g., establishing the secure protocol packet connection with the mobile station), a request for authentication of the mobile station and/or registration of one or more application programs is received from the mobile station. The request includes authentication credentials of the mobile station and one or more application programs to be registered for real-time or near real-time data transfer. Responsive to the request, an acknowledgment message that is sent, via the secure protocol packet connection, to the mobile station includes a data transfer encoding type set to a "chunked" mode, thereby establishing the secure protocol packet connection as a persistent connection with the mobile station.

Also, a response message sent to the mobile station indicates whether or not the authentication credentials of the mobile station have been successfully validated. After the mobile station is successfully authenticated over the persistent connection, heartbeat messages are sent to and/or received from the mobile station to determine whether or not the persistent connection is alive and available for real-time or near real-time data transfer.

In addition, for establishing and maintaining a persistent connection for real-time or near real-time data transfer, an exemplary mobile station includes: a wireless transceiver for wireless mobile communication through a mobile communication network; at least one user interface device, configured to receive user input; a processor coupled to the wireless transceiver and the at least one user interface device; a memory accessible by the processor; and programming in the memory for the processor, wherein execution of the programming by the processor configures the exemplary mobile station to perform real-time or near real-time data transfer functions.

The real-time or near real-time data transfer functions performed by the exemplary mobile station include functions to: establish a packet connection with a push engine in accordance with a secure protocol over a mobile communication network; and, via the secure protocol packet connection, send a request including authentication credentials of the mobile station and one or more application programs to be registered for real-time or near real-time data transfer. The real-time or near real-time data transfer functions also include functions to receive from the push engine an acknowledgment message including a data transfer encoding type set to a "chunked" mode, thereby establishing the secure protocol packet connection as a persistent connection with the push engine. The real-time or near real-time data transfer functions include functions to receive from the push engine a response message indicating whether or not the mobile station is successfully authenticated; and send a heartbeat message to or receive a heartbeat message from the push engine over the persistent connection to determine whether the persistent connection is alive and available for real-time or near real-time data transfer.

In addition, an exemplary system for establishing and maintaining a persistent connection between a mobile station and push platform is provided. The exemplary system includes: a push controller configured to receive real-time or near real-time data from a data source on a network, and a push engine configured to receive the real-time or near real-time data from the push controller and transfer the real-time or near real-time data to a mobile station through a mobile communication network.

The push engine of the exemplary system is configured to: establish a packet connection with the mobile station using a secure protocol over the mobile communication network; and receive from the mobile station a request including authentication credentials of the mobile station and one or more application programs to be registered for real-time or near real-time data transfer. The push engine is configured to, responsive to the request, send to the mobile station, via the secure protocol packet connection, an acknowledgment message including a data transfer encoding type set to a "chunked" mode, thereby establishing the secure protocol packet connection as a persistent session with the mobile station. The push engine is configured to send to the mobile station a response message indicating whether or not the authentication credentials of the mobile station have been successfully validated. The push engine is configured to send a heartbeat message to or receive a heartbeat message from the mobile station over the persistent connection to determine whether the persistent connection is still alive and available for real-time or near real-time data transfer.

Reference now is made in detail to the examples illustrated in the accompanying drawings and discussed below. FIG. 1 illustrates a system 10 offering a variety of mobile communication services, including wireless communications for various data communications services, mobile messaging services, and voice and/or video telephone services for users of mobile stations 13. For the purposes of simplicity, the example illustrates only two mobile stations (MSs) 13a and 13b and a mobile communication network 15. The mobile stations 13a and 13b are examples of mobile devices that may be used for various voice communications, data communications, and mobile messaging services. The mobile communication network 15 provides mobile wireless communications services to those mobile stations as well as to other mobile stations (not shown), for example, via a number of base stations (BSs) 17. The present techniques may be implemented in any of a variety of available mobile communication networks 15 and/or on any type of mobile station compatible with such a mobile communication network 15.

In the example, the mobile communication network 15 can be implemented as a network conforming to the code division multiple access (CDMA) type standard, the 3rd Generation Partnership Project 2 (3GPP2) standard, the Evolution Data Optimized (EVDO) standard, Long Term Evolution (LTE) standard, or other telecommunications standards or their variants used for mobile wireless communications. The mobile stations 13a and 13b are capable of conventional voice telephone and data communications.

The mobile stations 13a and 13b can take the form of portable handsets, smart-phones or personal digital assistants, tablet devices or the like, although they may be implemented in other form factors. The mobile stations 13a and 13b execute various stored mobile applications (or application programs) on the devices. Note that the terms "application(s)" and "application program(s)" are used synonymously herein. By way of example, the drawings depict the mobile station 13a as a "flip" open type feature phone with a keypad and display, and the mobile station 13b as a touch-screen type smartphone. An application running on a mobile station 13a or 13b may be configured to execute on many different types of the mobile stations. For example, a mobile application can be written to execute in an iOS or Android operating system, or on a binary runtime environment for a BREW-based mobile station, a Windows Mobile based mobile station, Java Mobile, or RIM based mobile station, or the like. Some of these types of mobile stations can employ a multi-tasking operating system as well.

The mobile communication network 15 can be implemented by a number of interconnected networks. Hence, the mobile communication network 15 may include a number of radio access networks (RANs), as well as regional ground networks interconnecting a number of RANs and a wide area network (WAN) interconnecting the regional ground networks to core network elements. A regional portion of the mobile communication network 15, such as that serving mobile stations 13a and 13b, can include one or more RANs and a regional circuit and/or packet switched network and associated signaling network facilities.

Physical elements of a RAN operated by a mobile service provider or carrier, include a number of base stations represented in the example by the base stations (BSs) 17. Although not separately shown, such a base station 17 can include a base transceiver system (BTS), which can communicate via an antennae system at the site of the base station 17 and over the air with one or more of the mobile stations, when the mobile stations are within a range. Further, each base station includes a BTS coupled to several antennae mounted on a radio tower within a coverage area often referred to as a "cell." The BTS is the part of the radio network that sends and receives radio frequency (RF) signals to/from the mobile stations 13a and 13b that are served by the base station 17.

The radio access networks can also include a traffic or communication network represented generally by the cloud at 15, which carries the user communications for the mobile stations 13a and 13b between the base stations 17 and other elements with or through which the mobile stations 13a and 13b communicate. In some examples, the mobile communication network 15 includes various network elements that support voice and data communications, including establishing and maintaining data connections (e.g., persistent connections). Other individual elements, such as switches and/or routers forming the traffic network are omitted here for simplicity. It will be understood that the various network elements can communicate with each other and other aspects of the mobile communications network and other networks, e.g., the public switched telephone network and the Internet 23, either directly or indirectly.

Also, the mobile communication network 15 includes one or more push platforms 21 for real-time or near real-time data communications with the mobile stations 13. The term "near real-time" is used herein to describe the timeliness of data or information that has been delayed by the time required for electronic communication or data processing. In the descriptions herein "near real-time" implies that there are no significant delays (e.g., no delays exceeding a couple of minutes). A push platform 21 can be implemented in one or more servers and is capable of receiving real-time or near real-time data from a data source, such as an application server 25 or 31. The push platform 21 sends or pushes the received data to the mobile stations 13a and 13b over persistent connections in accord with the disclosed techniques.

The carrier will also operate a number of systems that provide ancillary functions in support of the mobile communications services and/or application services provided through the system 10, and those elements communicate with other nodes or elements of the system 10 via one or more private Internet Protocol (IP) type packet data networks 29 (sometimes referred to as an Intranet), i.e., a private network. Generally, such ancillary systems are part of or connected for communication via the private network 29. It should be appreciated, however, that systems outside of the private network could serve the same functions as well. Examples of such systems, in this case operated by the network service provider as part of the overall network 10, which communicate through the intranet type network 29, include one or more application servers 31 or 25.

The mobile stations 13a and 13b communicate over the air with a base station 17 and through the mobile communication network 15 for various voice and data communications, e.g., through the Internet 23 with a server 25 and/or with application servers 31. If a data service is provided to the mobile stations 13a and 13b, the data service may be hosted on a carrier or third party operated application server 31 (e.g., an information server, stock prices service server, etc.), for communication via the networks 15 and 29. The application server 31 can be a data source for providing real-time or near real-time data to the mobile stations 13a and 13b. For example, the application server 31 (acting as an information server) can provide stock ticker update services and thus provide real-time or near real-time stock prices information in the form of notification messages to the mobile station 13a and 13b via the push platform 21 through the networks 29 and 15. In the example, a message containing data relating to received stock prices information can be pushed (or delivered) by the push platform 21 via one or more persistent connections to the mobile stations 13a and 13b that has registered or subscribed to the real-time data service for stock prices over the mobile communication network 15.

Alternatively, the real-time data service can be provided by a separate, third party entity (alone or through agreements with the carrier), in which case, the service may be hosted on an application server, such as a server 25 connected for communication via the networks 23 and 15. Servers such as 25 and 31 may provide any of a variety of common application or service functions in support of or in addition to an application program running on the mobile station 13a or 13b. However, for the purposes of discussion herein, we will focus on functions thereof in support of providing a real-time or near real-time data source that will utilize persistent connections to the mobile stations 13a and 13b. For a given service, including the mobile data service, an application program within the mobile station may be considered as a 'client' and the programming at 25 or 31 may be considered as the 'server' application for the particular service.

The real-time or near real-time data under consideration herein may be delivered to touch screen type mobile stations as well as to non-touch type mobile stations. Hence, our simple example shows the mobile station 13a as a non-touch type mobile station and shows the mobile station 13b as a touchscreen type mobile station. Thus, implementation of the disclosed techniques will involve at least some execution of programming in the mobile stations 13a and 13b.

Figure 2:
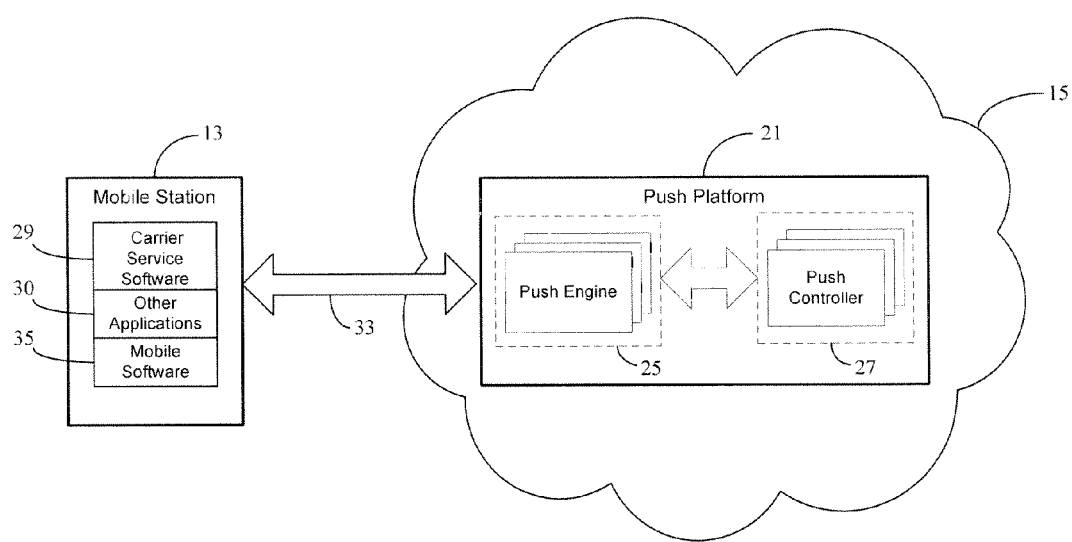
FIG. 2 is an illustration of architectural components employed in the disclosed techniques at a conceptual level.

FIG. 2 is an illustration of an architectural view of establishing a persistent connection, at a high level. At a conceptual level, the mobile station 13 (13a or 13b) includes earlier service software 29, other application programs 30, and mobile software 35. The carrier service software 29 is one or more carrier service programs, acting as a client, running on the mobile station 13 for at least establishing and maintaining persistent connections with a push platform 21 on the mobile communication network 15, and dispatching or routing received messages or real-time or near real-time data to other application programs 30 on the mobile station 13. The mobile station 13 also includes the other application programs 30 and mobile software 35 for various mobile communications functions in support of various services and functions, such as power management, connectivity management (such as MAN, Bluetooth, WiFi, etc.), security, phone calls, text messages, mobile data, mobile messaging, location services, etc. Also, other mobile specific application software can be incorporated in the mobile software 35 in support of OTA (over-the-air) data sync, games, mobile radio and TV, etc.

Also shown is a wireless data connection 33 that is established between the mobile station 13 and push platform 21 over the mobile communication network 15. The wireless data connection 33 over the mobile communication network 15 is termed as a "persistent connection" because the data communication between the mobile station 13 and push platform 21 is maintained or kept active to allow a push of data by the push platform 21 when needed. In other words, the persistent connection 33 is an ongoing communication session between two entities (or devices) 13 and 21. In this nomenclature, "connection" refers to a logical communication session through the packet network not necessarily a physical or electrical connection).

The persistent connection 33 is established using a Hyper Text Transfer Protocol (HTTP) between the mobile station 13 and the push engine 25 of the push platform 21, which will be described in detail later. Also, it is appreciated that HTTP is an application layer protocol and requires a transport layer protocol (e.g., Transmission Control Protocol (TCP) or Internet Protocol (IP)) for device-to-device data transfer. The persistent connection 33 can be thought of a dedicated data pipe for real-time or near real-time data exchange between the mobile station 13 and the push engine 25. As noted, in the example, the persistent connection 33 is a HTTP connection that uses the same packet connection to send and receive multiple HTTP requests and responses, as opposed to establishing a new connection for every single request and response pair. The persistent connection 33 thus enables the carrier service software 29 (or the mobile station 13) to receive real-time or near real-time data over the mobile communication network 15 from the push engine 25 or one or more application servers like 25 or 31. For example, the real-time or near real-time data is pushed to the mobile station 13 by the push engine 25 over the persistent connection 33, as the data becomes available.

As shown, the push platform 21 can include a plurality of push engines 25 and a plurality of push controllers 27. A push engine 25 can be a web server that holds and maintains millions of connections with different devices including mobile stations. The push engine 25 maintains the persistent connection 33 by regularly exchanging special messages called "heartbeat" messages with the mobile station 13 that has established the persistent connection 33 with the push engine 25. A heartbeat message is a short message sent to create network traffic over a long-lived network connection to keep end devices (and any intermediaries) from closing a stale connection and to indicate both ends of the connection are alive and still connected. The heartbeat messages can be sent to and/or from either the push engine 25 or mobile station 13 to keep the persistent connection 33 open or alive.

The push engines 25 communicate with the push controllers 27. A push controller 27 can be implemented in one or more servers equipped with capability to authenticate and/or validate authentication credentials of mobile stations 13 received through the push engines 25. The push controller 27 also maintains states of persistent connections 33 between the mobile stations 13 and push engines 25. It should be appreciated that depending upon the specific implementation architecture, there could be one-to-one or one-to-many correspondence between the push controllers 27 and the push engines 25. For example, a plurality of push engines 25 can be mapped to a single push controller 27, each push engine 25 can be mapped to a different push controller 27, or a combination of the two may be present.

In the example, real-time or near real-time data can come from remote application servers like 25 or 31. In such a case, the real-time or near real-time data is delivered to one or more push controllers 27 of the push platform 21 for delivery to a mobile station 13. The push controller 27 sends the received real-time or near real-time data to the push engine 25 that has established a persistent connection with the mobile station 13 that is to receive the real-time or near real-time data. The push engine 25 pushes the real-time or near real-time data over the persistent connection to the mobile station 13.

As noted earlier, a persistent connection is a logical communication session established between a mobile station and push engine so that the mobile station can receive real-time or near real-time data from the push engine. This connection is established over a packet connection using various protocols, including TCP/IP, Secure Socket Layer (SSL), and HTTP protocols.

More specifically, the mobile station 13 establishes a TCP/IP connection to the push engine 25 for initial data communications. Then, to enable secure data transfer between the mobile station 13 and push engine 25, a series of message exchanges occurs for a SSL handshake between the mobile station 13 and push engine 25. SSL is a security protocol used to encrypt the data over a network connection. In the example, a standard SSLSocket implementation (using the Transport Layer Security (TLS) security protocol) is used for establishing a persistent connection between the mobile station 13 and push engine 25. It should be appreciated that other implementations of different security protocols can be used in establishing the persistent connection between the mobile station 13 and push engine 25.

After a successful SSL handshake, the TCP/IP connection becomes a secure protocol packet connection for secure data transfer. In the example, the HTTP protocol is used to establish the secure protocol packet connection as a persistent connection between the mobile station 13 and push engine 25. For example, an HTTP "chunked" connection (e.g., data transfer encoding is set to a "chunked" encoding mode) over the secure protocol packet connection between the mobile station 13 and push engine 25 establishes the secure protocol packet connection as a persistent connection between the mobile station 13 and push engine 25.

The "chunked" encoding is a specific data transfer encoding type and specifies that the message content is to be broken up into a number of "chunks," each of which is prefixed by its size in bytes. Thus, the "chunked" encoding is used when a large number of data is sent to a mobile device and the total size of the data cannot be known until it is fully processed. In the example, the "chunked" encoding allows HTTP messages to be broken up into several parts and enables transmission of a large amount of data to the mobile station 13 from the push engine 25 over the persistent connection 33.

Figure 3:
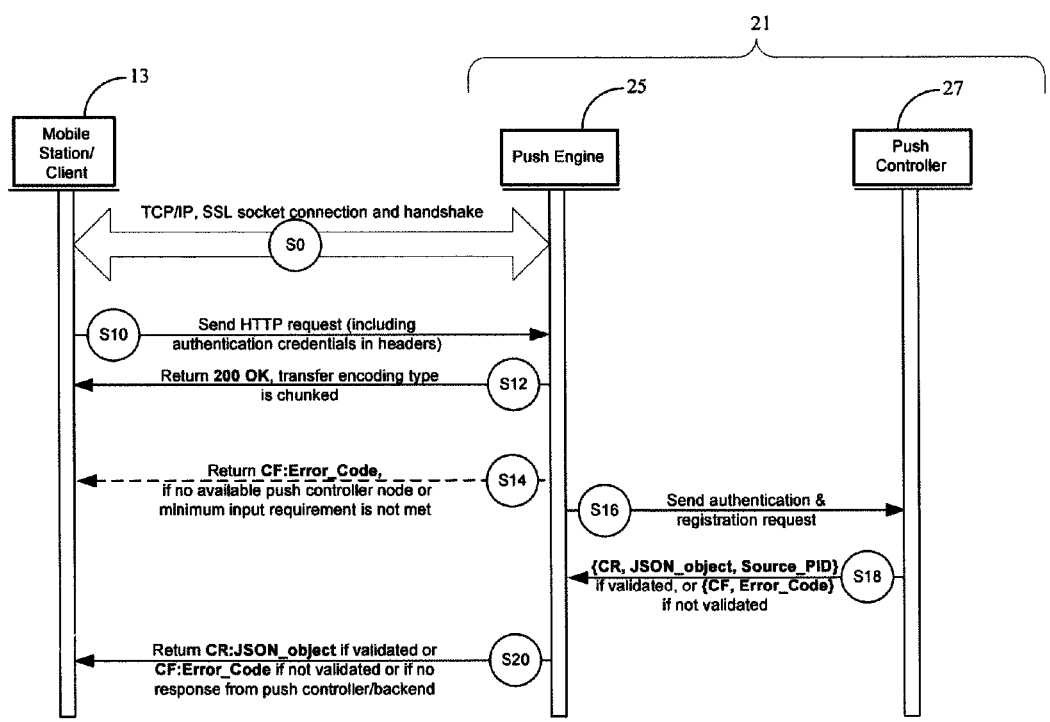
FIG. 3 is a flow diagram illustrating an exemplary protocol for establishing a persistent connection.

As shown in FIG. 3, a flow diagram illustrates an exemplary protocol for establishing a persistent connection between a mobile station and push engine. In the description, the term "client" refers to the mobile station 13 including one or more client applications running on the mobile station 13. By way of example, at S0, various message communications (not shown in detail) occur in order to establish a secure protocol packet connection, e.g., via a SSL socket connection and handshake, over a TCP/IP connection between the mobile station 13 and push engine 25. That is, in the example, the mobile station 13 starts establishing a TCP/IP connection to the push engine 25 and performs a SSL handshake with the push engine 25 using standard built-in input/output (I/O) libraries of the mobile station 13. The SSL handshake validates the push engine's certificate using a certificate chain (i.e., a series of related digital certificates) sent from the push engine 25. A certificate is a digital fingerprint assigned to a network element (server or client) by a trusted authority that is used to authenticate the network element's identity. The mobile station 13 receives the details of the certificate issued with the push engine's name and compares them to those of the next certificate in the chain (the intermediary certificate, if any is present). The mobile station 13 also compares that the intermediary certificate's details to a list of trusted certificates in the trusted root keystore on the mobile station 13. A trusted root keystore is a repository for storage and retrieval of certificates on the mobile station 13. If the certificate details match and a "trust chain" can be built from a trusted root certificate to the one the push engine 25 was issued with its name, the SSL handshake passes and a secure protocol packet connection is established between the mobile station 13 and push engine 25.

The trusted mobile station root certificates keystore can be preloaded by Google or the like. Each contains the trusted root certificates from valid certificate authorities who issue all trusted server certificates. In the example, only servers (e.g., push engines) which are issued certificate chains that are based on one of the trusted root certificates are validated and pass the SSL handshake process. If the certificate is self-signed or does not validate against any of the trusted certificates, the SSL handshake fails and an exception is thrown. This mechanism thus protects against "man in the middle" attacks.

At S10, to set up the secure protocol packet connection as a persistent connection between the mobile station 13 and push engine 25, the mobile station 13 (or the carrier service software 29) sends an HTTP POST request to the push engine 25 over the secure protocol packet connection. The HTTP POST is one of the request methods supported by the HTTP protocol, which is used for sending data from a client device as part of an HTTP request. In the example, the HTTP POST request includes in its header authentication credentials of the mobile station 13 and application program(s) to be registered and/or validated for real-time or near real-time data transfer service. At S12, the push engine 25 responds with an acknowledgment message (e.g., a "200 OK" response message) with data transfer encoding set to "chunked" and informs the mobile station 13 that the request was received, thereby establishing the secure protocol packet connection as a persistent connection between the mobile station 13 and push engine 25. The push engine 25 then attempts to perform authentication of the mobile station 13 and registration of the application programs via a push controller 27.

At S14, if no push controller is available or if there are missing required parameters in the request (e.g., missing parameters in the header), a failure response (e.g., CF:Error_Code) is returned to the mobile station 13 with error code indicating a failure reason. On the other hand, if a push controller is available for authentication and registration operations and the request has all required input parameters, at S16, the push engine 25 forwards the received authentication credentials and registration request data to the push controller 27. That is, the push engine 25 asynchronously validates the mobile station credentials with an authentication server (not shown) on a network via the push controller 27. At S18, the push controller 27 returns an authentication message containing the authentication and registration results to the push engine 25 that requested the authentication and registration of the application(s). If the authentication credentials of the mobile station 13 are successfully validated, the authentication message indicates a successful authentication in the message as in the following message format: e.g., {CR, JSON_object, Source_PID} where "CR" indicates authentication success; "JSON_object" is a formatted object that contains information relating to a session identification, session's remaining life in minutes; and "Source_PID" contains a process identification of a worker process on the push controller 27. A JSON_object is a JavaScript object notation for a lightweight data interchange format. On the other hand, if the authentication is not successful (e.g., the authentication credentials of the mobile station 13 are not successfully validated), the authentication message indicates an authentication failure in the message as in the following format: e.g., {CF. Error_Code} where "CF" indicates authentication failure; and "Error_Code" indicates an error code for the failure. At S20, the push engine 25 sends to the mobile station 13 an authentication result response message (e.g., CR:JSON_object or CF:Error_Code) indicating to the mobile station 13 whether or not the mobile station 13 is successfully authenticated. A response message containing CR:JSON_object is returned for an authentication success result; and a response message containing CF:Error_code is returned for an authentication failure result or no response received from the push controller or backend. After the successful authentication (e.g., CR:JSON_object), the mobile station 13 or push engine 25 can send real-time or near real-time data over the persistent connection established between the mobile station 13 and push engine 25. However, if the authentication of the mobile station 13 is not successful (e.g., CF:Error_Code), then the persistent connection is torn down and closed by either the mobile station 13 or push engine 25.

In the example, the real-time or near real-time data or message is transmitted over the persistent connection as a "chunked" message. A chunked message over the persistent connection can be of any length. The chunked message includes the length information in hexadecimal specified before the body of the message informing the receiving device of how much data to expect or read. By way of example, a chunked message can be in the following format:

```
C\r\n
Data chunk\r\n
```

In the example above, "C" in hexadecimal represents 12 characters of length in the "Data chunk" message including the trailing characters "\r\n". The "\r\n" characters after the length and chunked message body represent a carriage return character ("\r") and new line character ("\n"). These trailing characters tell the receiving device that the data on that line has been completely received, and the subsequent characters should start on the next line.

Figure 4:
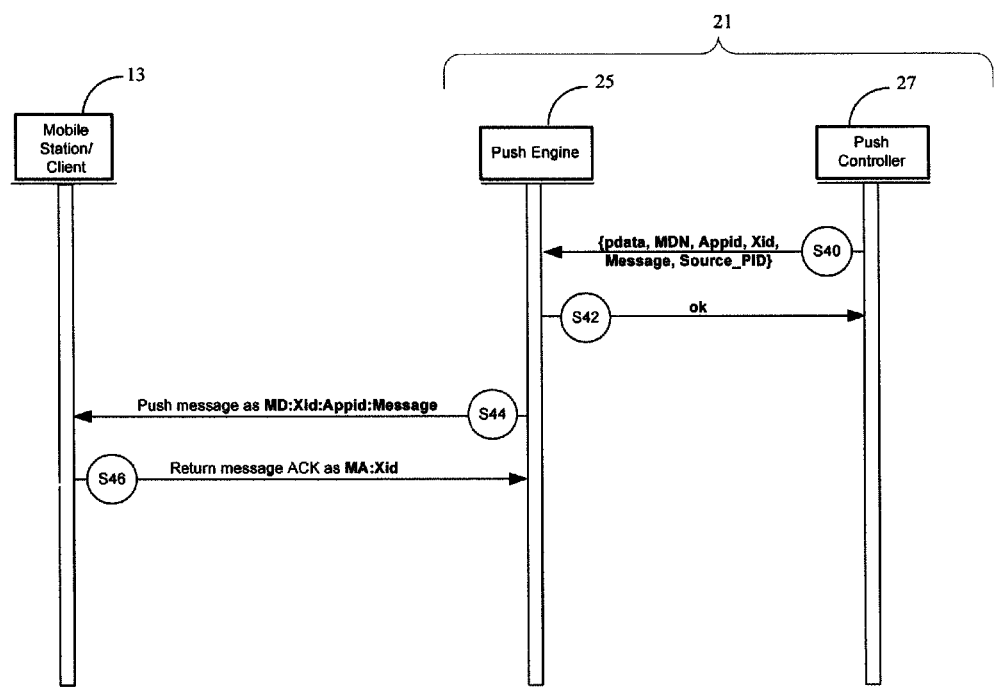
FIG. 4 is a flow diagram illustrating an exemplary protocol for pushing real-time or near real-time data or messages to a mobile station.

FIG. 4 shows an exemplary protocol illustrating how a push platform sends a push message to a mobile station. That is, the exemplary protocol illustrates how real-time or near real-time data is sent by the push engine 25 to the mobile station 13. Once the persistent connection is established as in FIG. 3, real-time or near real-time data can be sent from various data sources including the push controller 27 to the mobile station 13 over the persistent connection, as the data becomes available.

More specifically, at S40, the push controller 27 receives real-time or near real-time data from a backend server or system (not shown), and sends to the push engine 25 a tuple containing the real-time or near real-time data and other information. The tuple is an ordered list of elements and contains information as in the following format: e.g., {pdata, MDN, Appid, Xid, Message, Source_PID} where "pdata" indicates to data for push, "MDN" is a mobile directory number of the mobile station 13, "Appid" is an identification of the application that is to receive the message or real-time data, "Xid" is a transaction identification, "Message" is a message body containing the real-time data to be delivered to the application, and "Source_PID" is a process identification of a worker process on the push controller 27 that is used by the push engine 25 to send an acknowledgement (as at S42) back to the push controller 27 that the message was received.

At S42, after receiving the tuple, the push engine 25 sends an acknowledgement, e.g., an OK return message, to the push controller 27. At S44, the push engine 25 prepares and sends a push message to the mobile station 13 containing the real-time or near real-time data over the persistent connection. The push message contains information as in the following message format: MD:Xid:Appid:Message, where "MD" refers to message data, "Xid" is the transaction identification, "Appid" is the application identification that is to receive the message data, and "Message" is the message body containing the real-time data to be delivered to the application. By way of example, an exemplary push message to the mobile station 13 can be given as follows:

MD:54825:com.vzw.push.vzwservice:{"ticker":"Time for the meeting—join the conference call","title":"Conference Call", "message": "Join the conference call", "action": "android.intent.action.CALL", "data": "tel:8881213344,,, 1,,, 888222,%23,,, 1"}.

At S46, the mobile station 13 acknowledges the push message by returning an acknowledgment message (e.g., MA:Xid where "MA" refers to a message acknowledgment, and "Xid" is the transaction identification that was received in the push message from the push engine 25 at S44).

Figure 5:
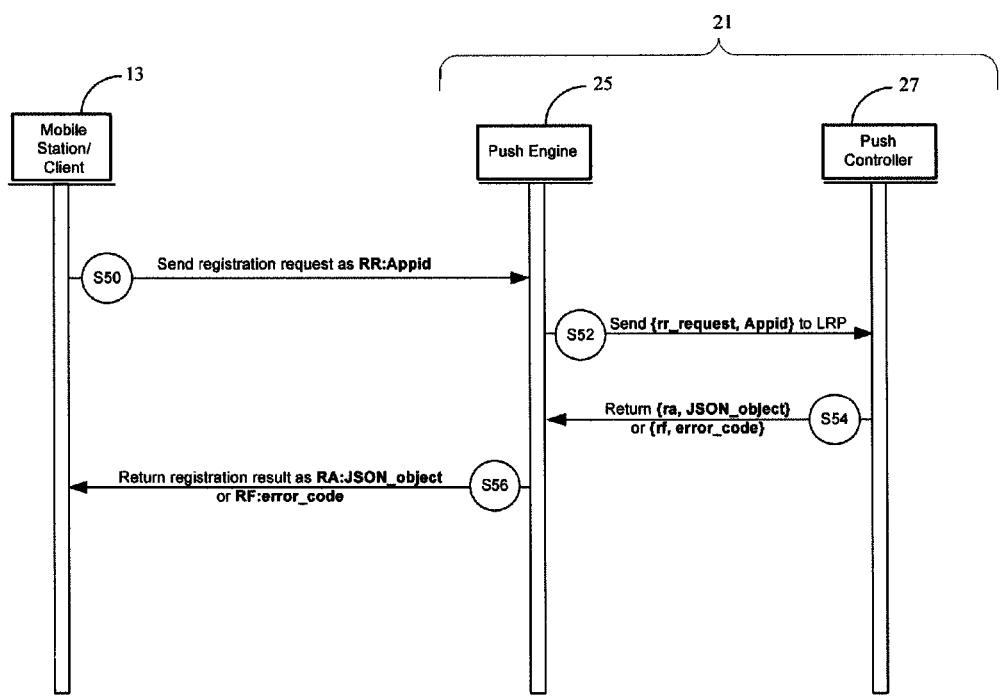
FIG. 5 is a flow diagram illustrating an exemplary protocol for registering a new application on a mobile station to receive real-time data updates.

FIG. 5 shows an exemplary protocol for registering a new application on a mobile station for receiving real-time or near real-time data using the disclosed techniques. For example, the flow diagram of FIG. 5 provides an exemplary protocol used when a new application is installed on a mobile station and a user desires to register the new application with the carrier to receive real-time or near real-time data update services for the new application.

At S50, the mobile station 13 sends, via a persistent connection, a registration request message to the push engine 25 for registering a newly installed application on the mobile station 13 as in the following message format: RR:Appid where "RR" refers to a registration request, and "Appid" is an application's agreed-upon identification value. At S52, after the push engine 25 receives the registration request message, the push engine 25 sends the received registration information to the push controller 27, in particular, to a locally-registered process (LRP) that handles specific client's requests. The push controller's LRP processes the registration request and, at S54, responds to the push engine 25 with a return message, e.g., a tuple containing registration result information: e.g., {ra, JSON_object} for registration success and {d, error_code} for registration failure. JSON_object contains session information and an updated list of applications for which the mobile station 13 is registered, and error_code indicates what caused the registration failure and if a retry is possible. At S56, the push engine 25 prepares and sends, via the persistent connection, a registration result response message to the mobile station 13. For a successful registration, a registration result response message containing JSON_object (e.g., RA:JSON_object) is sent to the mobile station 13; and for an unsuccessful registration, a registration result response message containing error_code (e.g., RF:error_code) is sent to the mobile station 13.

In the disclosed techniques, a persistent connection between a mobile station 13 and push engine 25 is maintained by using a special message called a "heartbeat" message. A heartbeat message is a short message sent to keep devices (e.g., the mobile station and push engine) from closing a stale connection and to indicate that both ends of the connection are alive and still connected. Thus, in the example, the heartbeat messages inform the mobile station 13 and push engine 25 that the persistent connection is still open and alive during periods of inactivity for data messages. The heartbeat message can be sent by either the mobile station 13 or push engine 25. If the heartbeat message sent by the mobile station 13 (or push engine 25) is not acknowledged by the push engine 25 (or mobile station 13), the mobile station 13 (or push engine 25) tears down the persistent connection. In this way, either the mobile station 13 or push engine 25 can detect whether or not the persistent connection was lost, and the mobile station 13 is allowed to reestablish a new persistent connection in the future.

Figure 6:
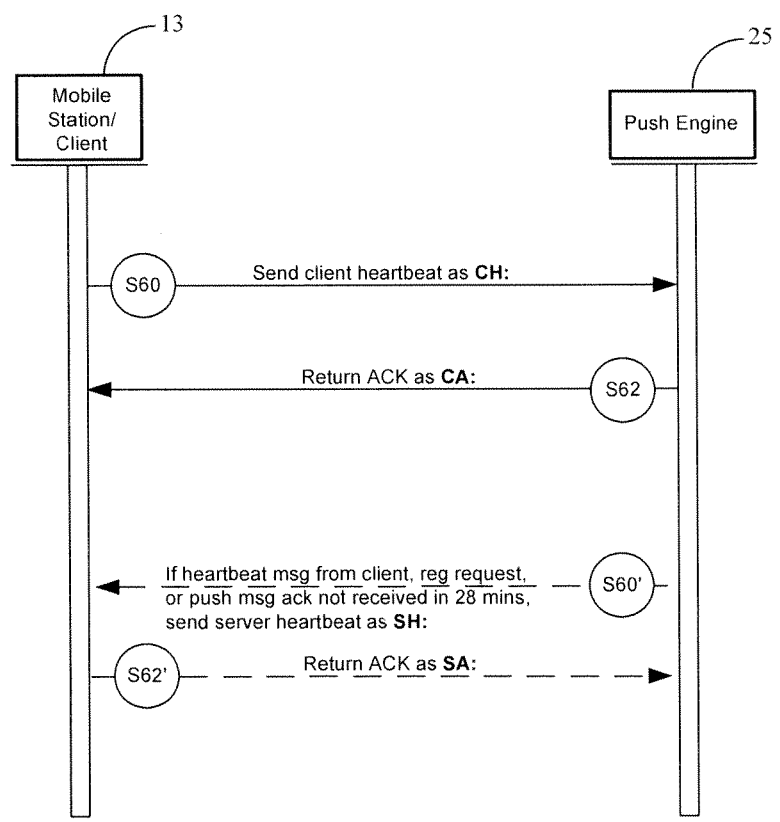
FIG. 6 is a flow diagram illustrating an exemplary protocol for sending and/or receiving heartbeat messages.

FIG. 6 illustrates an exemplary protocol for sending and/or receiving heartbeat messages between the mobile station 13 and push engine 25. At S60 and S62, FIG. 6 shows how a heartbeat message is sent by the mobile station 13 and acknowledged by the push engine 25. Specifically, at S60, the mobile station 13 sends a heatbeat message in the following message format: CH: where "CH" means a client-sent (or mobile station-sent) heartbeat message. In response, if the persistent connection is still open and available, at S62, the push engine 25 responds with an acknowledgement message (e.g., a message in the following format: CA: where "CA" means a client-sent (or mobile station-sent) heartbeat message acknowledgement) to keep the persistent connection open for real-time or near real-time data transfer. In the example, the mobile station 13 periodically sends a heartbeat message to the push engine 25. That is, a heartbeat message by the mobile station 13 is sent every 27.5 minutes. The time interval of 27.5 minutes is selected for the heartbeat message by the mobile station 13 such that the heartbeat message is sent to the push engine 25 before the push engine 25 sends out its own heartbeat message to the mobile station 13 (e.g., the push engine 25 sends a heartbeat message every 28 minutes, as described below) or before a time-out on a network side (e.g., a time-out by any intermediate device) due to inactivity or no data traffic over the established persistent connection between the mobile station 13 and push engine 25.

Also, when the mobile station 13 detects that its persistent connection is lost (e.g., a user of the mobile station 13 turns on "airplane mode" in which the mobile station's wireless radio is turned off), the mobile station 13 waits until a network connection is reestablished and sends an "on-demand" heartbeat message using the similar protocol above to the push engine 25. In the example, the mobile station 13 sends the on-demand heartbeat message when the persistent connection with the push engine 25 is temporarily lost and then reestablished. In another implementation, the on-demand heartbeat message can be sent by the mobile station 13 if there is no message or data received within a predetermined time period (or a timeout period) from the push engine 25. If the push engine 25 acknowledges the heartbeat message including the on-demand heartbeat message sent by the mobile station 13, the persistent connection remains open for continued real-time or near real-time data transfer. However, if no acknowledgement is received from the push engine 25 within a network response time (e.g., in the example, the network response time can be set to 30 seconds after sending the heartbeat message to the push engine 25), then the persistent connection is torn down by the mobile station 13 by disconnecting its packet connection (e.g., close hardware and/or software port connection) to the push engine 25. The mobile station 13 then attempts to reestablish the persistent connection with the push engine 25. Alternately, different values for the timeout period (e.g., 27.5-minutes) and network response time may be selected and used, for example, based on other network conditions including mobile traffic.

As illustrated in FIG. 6, the push engine 25 can also check the status of the persistent connection with the mobile station 13, by sending a heartbeat message to the mobile station 13 to determine whether or not the persistent connection is still open and available for data transfer. At S60', if, within a predetermined mobile station response time (e.g., 28 minutes), the push engine 25 does not receive from the mobile station 13 any message including: a heartbeat related message ("CH:" or "SA:"), a registration request ("RR:"), or an acknowledgement ("MA:"), the push engine 25 sends a heartbeat message to the mobile station 13 to determine whether the persistent connection is still open and available. If the persistent connection is open and available, responsive to the heartbeat message sent by the push engine 25, at S62', the mobile station 13 sends an acknowledgement message (e.g., "SA:") to the push engine 25 to keep the persistent connection open. If an acknowledgement is not received from the mobile station 13, on the other hand, the push engine 25 tears down the persistent connection. In the example, the predetermined mobile station response time can is determined by the carrier or operator based on various network conditions including mobile traffic conditions.

In the example, when the mobile station 13 fails to establish a persistent connection to the push engine 25, the mobile station 13 can use various types of retry algorithms for connection attempts. FIG. 7 shows an exemplary retry algorithm for the connection attempts by the mobile stations 13 based on an exponential backoff scheme. The exemplary retry algorithm defines how subsequent connection attempts are spaced temporally and defines the next time for the mobile station 13 to attempt a connection rather than immediately trying to reconnect without any success. The retry algorithm protects the push engine 25 from being overloaded with numerous connection attempts after any widespread outages and also protects the mobile station 13 from unnecessary battery drainage due to excessive retry attempts.

In the exemplary retry algorithm, as shown in a table of FIG. 7, the parameter "K" represents the number of times the connection attempt by the mobile station 13 has failed (with K=0 being the first connection attempt). By way of example, the waiting time ("T") for the mobile station 13 is determined as follows:

If it is the first connection attempt (e.g., K=0), the waiting time for the mobile station is 5 seconds.

If it is the second connection attempt (e.g., K=1), the waiting time for the mobile station is selected as a random number (which is generated by a random number generator) in a range from 5 to 60 seconds.

If the retry attempt is the third or more but less than seventh attempt (e.g., K>=2 and K<<6), the waiting time for the mobile station before making another connection attempt is selected as a random number in a range from $(2^{K-2}*60)$ seconds to $(2^{K-1}*60)$ seconds. That is, for K=2, the waiting time ranges from 60 to 120 seconds; for K=3, the waiting time ranges from 120 to 240 seconds; the waiting time ranges from 240 to 480 seconds; and the waiting time ranges from 480 to 960 seconds. If the retry attempt is the seventh attempt (K=6), then the mobile station stops attempting to establish a persistent connection, and retries later when a network connection is reestablished or the mobile station is switched off and turned back on. Alternately, the retry algorithm can be based on server-sent (or push engine-sent) information pertaining to how long the mobile station should wait to attempt reconnection if the persistent connection is lost. For example, in the event of a planned future outage of a push engine (e.g., a planned outage of a push engine due to a large number of connected mobile stations or other equipment issues), the push engine sends a message to the mobile station to reconfigure the retry algorithm of the mobile station such that the connection attempt by the mobile station is not made during the planned outage of the push engine.

The mobile station 13 uses the exemplary retry algorithm, for example, (i) when establishing an initial persistent connection between the mobile station 13 and push platform 21, and (ii) when reestablishing a persistent connection that is temporarily broken due to loss of network coverage or any other reason. In the example, connection attempts can fail because of various reasons including mobile station related issues or network outage or push engine related issues (or other network side issues). More specifically, an initial persistent connection attempt or existing persistent connection fails when the network becomes unavailable due to poor signal or the mobile station 13 gets switched off. If the mobile station 13 attempts its initial persistent connection and fails, the mobile station 13 may use the exemplary retry algorithm. If an established persistent connection is broken (e.g., when the network connection is lost), the mobile station 13 (or the carrier service software 29) sends a heartbeat message to the push engine 25 when the network connection becomes available again. If the mobile station 13 does not receive an acknowledgement from the push engine 25 within 30 seconds of sending the heartbeat message to the push engine 25, the mobile station 13 determines that the original persistent connection is broken and closes the persistent connection. Later, the mobile station 13 may attempt to reestablish a persistent connection in accordance with the exemplary retry algorithm.

In addition, in the event of a network service outage, any persistent connection attempt may fail and existing connections may be broken. If the outage is widespread and impacts many mobile stations which are all waiting to re-connect, the exemplary retry algorithm prevents push engines from getting overloaded (when the network service becomes available again). It is also possible that the push engines may experience a service outage and have backup servers fail, losing any persistent connections. In such a case, when the mobile station detects the lost connection, it will follow the exemplary retry algorithm.

It should be appreciated that while the structure, programming and operations of the various types of mobile stations are generally known, for completeness, it may be useful to consider the functional elements/aspects of two exemplary mobile stations 13a and 13b, at a high-level. Also, although, for the purposes of illustration, two exemplary mobile stations 13a and 13b are described herein, the disclosed techniques can be used with various types of mobile devices for machine-to-machine or text-only data communications. The mobile devices for machine-to-machine or text-only communications may include tablet computers, electronic readers, or the like.

Figure 8A:
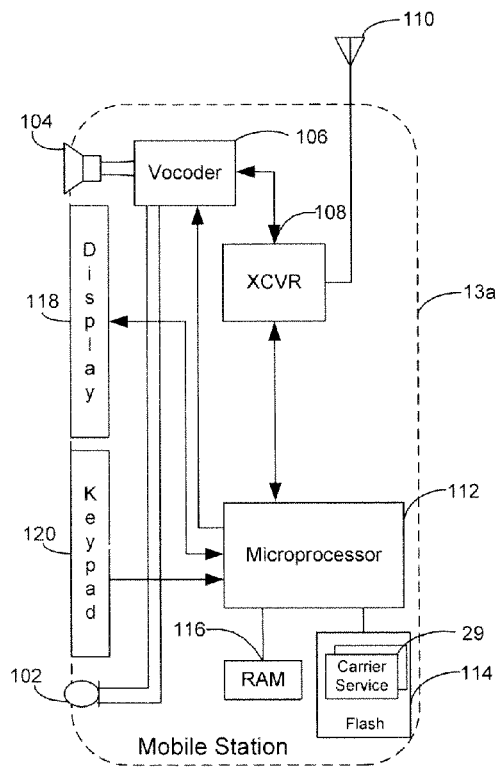
FIGS. 8A and 8B illustrate high-level functional block diagrams of exemplary non-touch type and touch type mobile stations used in a network or system like that shown in FIG. 1.
Figure 8B:
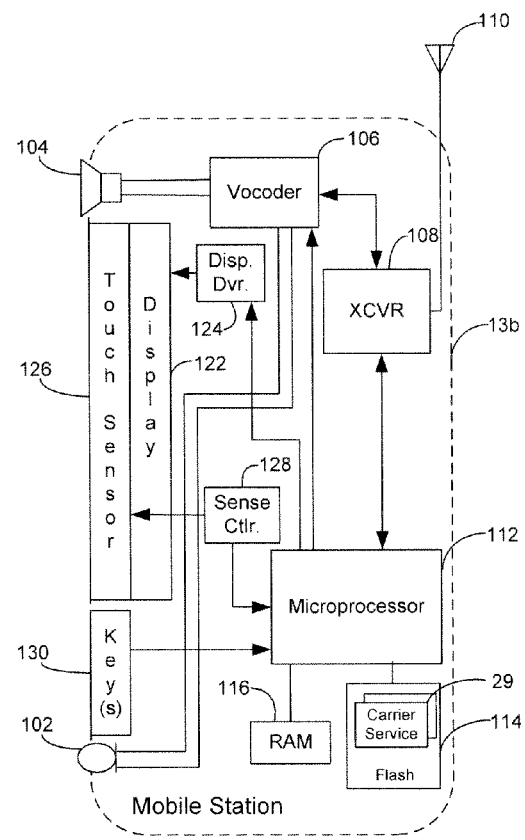

FIGS. 8A and 8B illustrate block diagrams of exemplary non-touch type and touch type mobile stations.

FIG. 8A provides a block diagram illustration of an exemplary non-touch type mobile station 13a. As noted above, although the mobile station 13a may be a smart-phone or may be incorporated into another device, such as a personal digital assistant (PDA), a personal computer (PC), or the like, for discussion purposes, the illustration shows the mobile station 13a is in the form of a handset. The handset embodiment of the mobile station 13a functions as a normal digital wireless telephone station. For that function, the station 13a includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13a also includes at least one digital transceiver (XCVR) 108. Today, the handset 13a would be configured for digital wireless communications using one or more of the common 3G and/or 4G network technology types. The mobile station 13a may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13a and the communication network. Each transceiver 108 connects through RF send and receive amplifiers (not separately shown) to an antenna 110. The transceiver 108 may also support various types of mobile messaging services, such as short message service (SMS), enhanced messaging service (EMS) and/or multimedia messaging service (MMS). The bearer transport resources of the transceiver 108 can support voice communications or can support data communications, both at the same time, depending on the applicable wireless technology of the transceiver and the network.

The mobile station 13a includes a display 118 for displaying messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones. In addition to normal telephone and data communication related input/output (including message input and message display functions), the user interface elements also may be used for display of menus and other information to the user and user input of selections and real-time or near real-time data received from a remote data source using the disclosed techniques herein.

A microprocessor 112 serves as a programmable controller for the mobile station 13a, in that it controls all operations of the mobile station 13a in accord with programming that it executes, for all normal operations, and for operations involved in procedures for establishing and maintaining a persistent connection with a push platform 21 for real-time or near real-time data transfer under consideration here. In the example, the mobile station 13a includes flash type program memory 114, for storage of various "software" or "firmware" program routines and mobile configuration settings, such as mobile directory number (MDN) and/or mobile identification number (MIN), etc. The mobile station 13a may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, including client browser software, other application software 30, and carrier service software 29, etc.

The carrier service software 29 is one or more carrier service programs (acting as a client) running on the mobile station 13a for performing various real-time or near real-time data transfer functions disclosed herein, including functions to: establish and maintain a persistent connection with one or more push engines 25 of the push platform 21 over the mobile communication network 15, and to dispatch or route received real-time or near real-time data or message to other application programs like 30 running on the mobile station 13a.

The memories 114 and 116 also store various data, such as telephone numbers and server addresses, downloaded data, such as multimedia content, and various data input by the user. Programming stored in the flash type program memory 114, sometimes referred to as "firmware," is loaded into and executed by the microprocessor 112.

FIG. 8B provides a block diagram illustration of an exemplary touch screen type mobile station 13b. Although possible configured somewhat differently, at least logically, a number of the elements of the exemplary touch screen type mobile station 13b are similar to the elements of mobile station 13a, and are identified by like reference numbers in FIG. 3A. For example, the touch screen type mobile station 13b includes a microphone 102, speaker 104 and vocoder 106, for audio input and output functions, much like in the earlier example. The mobile station 13b also includes at least one digital transceiver (XCVR) 108, for digital wireless communications, although the handset 13b may include an additional digital or analog transceiver.

As in the station 13a, the transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13b and the communication network. Each transceiver 108 connects through RF send and receive amplifiers (not separately shown) to an antenna 110. The transceiver 108 may also support various types of mobile messaging services.

As in the example of station 13a, a microprocessor 112 serves as a programmable controller for the mobile station 13b, in that it controls all operations of the mobile station 13b in accord with programming that it executes, for all normal operations, and for operations involved in the procedure of establishing and maintaining a persistent connection with the push platform 21 on the network under consideration here. In the example, the mobile station 13b includes flash type program memory 114, for storage of various program routines and mobile configuration settings. The mobile station 13b may also include a non-volatile random access memory (RAM) 116 for a working data processing memory. Of course, other storage devices or configurations may be added to or substituted for those in the example. Hence, outlined above, the mobile station 13b includes a processor, and programming including application software 122. The programming stored in the flash memory 114 configures the processor of the mobile station to perform various desired functions, including in this case the functions involved in the technique for establishing and maintaining a persistent connection with the push platform.

The carrier service software 29 is one or more carrier service software programs (acting as a client) running on the mobile station 13b for performing various real-time or near real-time data transfer functions disclosed herein, including functions to: establish and maintain a persistent connection with one or more push engines 25 of the push platform 21 over the mobile communication network 15, and to dispatch or route the received real-time or near real-time data or message to other application programs like 29 running on the mobile station 13b.

In the example of FIG. 8A, the user interface elements included a display and a keypad. The mobile station 13b may have a limited number of key 130, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile station 13b includes a display 122, which the microprocessor 112 controls via a display driver 124, to present visible outputs to the device user. The mobile station 13b also includes a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile station 13b. The microphone 102 and speaker 104 may be used as additional user interface elements, for audio input and output.

The structure and operation of the mobile stations 13a and 13b, as outlined above, were described to by way of example, only.

As shown by the above discussion, in addition to functions implemented, by the mobile station, some functions relating to establishing and maintaining persistent connections between devices may be implemented on computers connected for data communication via the components of a packet data network, operating as separate network or server elements as shown in FIG. 1. Although special purpose devices may be used, such devices also may be implemented using one or more hardware platforms intended to represent a general class of data processing device commonly used to run "server" programming so as to implement a push engine, push controller, application server(s), etc. discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for establishing and maintaining persistent connections for real-time or near real-time data transfer. The software code relates to such server or network element functions and is executable by the general-purpose computer. In operation, the code is stored in a non-transitory storage medium within the general-purpose computer platform. At other times, however, the software may be stored at other locations and/or transported for loading into the appropriate general-purpose computer system. Software code for applications or other programming for the mobile stations also may be stored in a server and transmitted through the network for storage in memories of the mobile stations.

Figure 9:
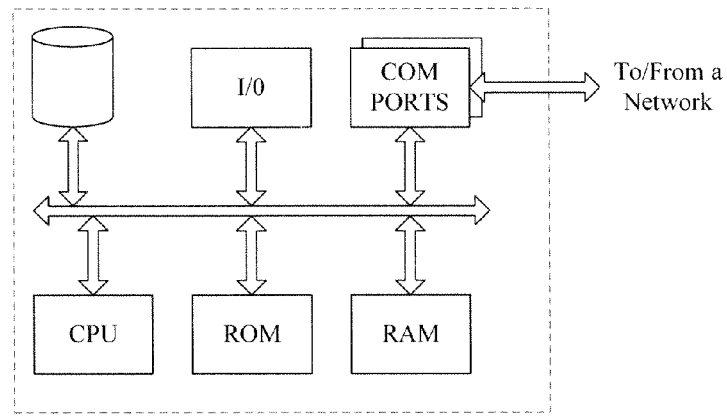
FIG. 9 is a simplified functional block diagram of a computer that may be configured as a host or server, as shown in the system of FIG. 1.
Figure 10:
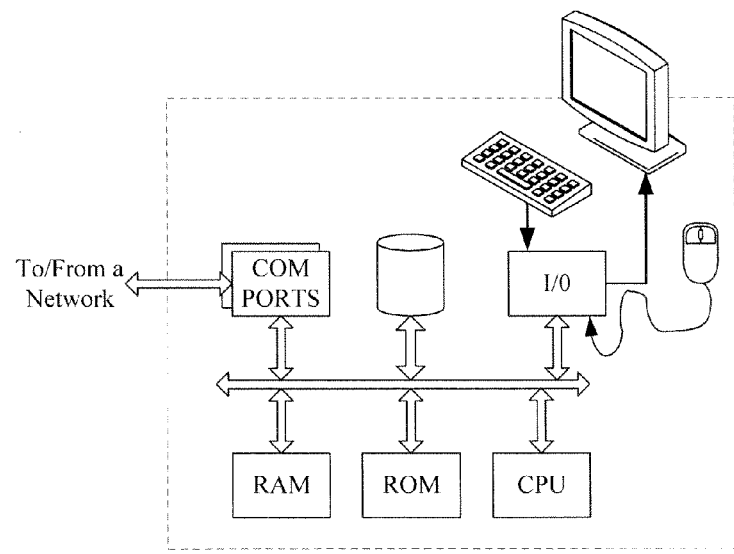
FIG. 10 is a simplified functional block diagram of a personal computer or other type of work station or terminal device.

FIGS. 9 and 10 provide functional block diagram illustrations of general purpose computer hardware platforms. FIG. 9 illustrates a network or host computer platform, as may typically be used to implement a server. FIG. 10 depicts a computer with user interface elements, as may be used to implement a personal computer or other type of work station or terminal device, although the computer of FIG. 10 may also act as a server if appropriately programmed. It should be appreciated that the structure, programming and general operation of such computer equipment are familiar art and as a result the drawings should be self-explanatory.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   establishing a packet connection with a mobile station using a secure protocol over a mobile communication network;
   receiving, from the mobile station, a request via the secure protocol packet connection, the request including authentication credentials of the mobile station to be registered for real- time or near real-time data transfer;
   responsive to the request, sending to the mobile station, via the secure protocol packet connection, an acknowledgment message including a data transfer encoding type set to a chunked mode, thereby establishing the secure protocol packet connection as a persistent connection with the mobile station;
   responsive to the request, sending to the mobile station a response message indicating whether or not the authentication credentials of the mobile station are successfully validated; and
   after the successful validation of the authentication credentials of the mobile station, (1) sending real-time or near real-time data, as a chunked message, over the persistent connection; and (2) sending a heartbeat message to the mobile station or receiving a heartbeat message from the mobile station, over the persistent connection, to determine whether the persistent connection is alive and available for transfer of the real-time or near real-time data in order to maintain the persistent connection.

2. The method of claim 1, wherein sending the heartbeat message to the mobile station or receiving the heartbeat message from the mobile station is performed periodically over the persistent connection such that the period of receiving heartbeat messages from the mobile station is less than the period of sending heartbeat messages to the mobile station.

3. The method of claim 1, wherein establishing the packet connection with the mobile station further includes establishing a packet connection in accordance with a retry algorithm adopted by the mobile station, wherein the mobile station waits a predetermined period of time that is based on the number of connection attempts made by the mobile station.

4. The method of claim 1, further comprising sending a push message to the mobile station over the successfully validated persistent connection, wherein the push message comprises real-time or near real-time data received from a data source over a network.

5. The method of claim 4, wherein the push message further comprises identification information of one or more application programs running on the mobile station and received the real-time data.

6. The method of claim 4, further comprising receiving from the mobile station an acknowledgement responsive to the push message.

7. The method of claim 1, further comprising:
   receiving from the mobile station a registration request for registering an application program on the mobile station for real-time or near real-time data transfer over the persistent connection; and
   sending to the mobile station a registration result message indicating whether or not the registration of the application program is successfully performed.

8. The method of claim 1, further comprising:
   receiving the heartbeat message from the mobile station via the persistent connection over the mobile communication network; and
   responsive to the heartbeat message, sending an acknowledgment message to the mobile station, informing that the persistent connection with the mobile station is alive and open for real-time or near real-time data transfer.

9. The method of claim 1, further comprising if an acknowledgment message is not received from the mobile station, in response to the heartbeat message sent to the mobile station, tearing down the persistent connection with the mobile station.

10. A mobile station comprising:
    a wireless transceiver for wireless mobile communication through a mobile communication network;
    at least one user interface device, configured to receive user input;
    a processor coupled to the wireless transceiver and the at least one user interface device;
    a memory accessible by the processor; and programming in the memory for the processor, wherein execution of the programming by the processor configures the mobile station to perform real-time or near real-time data transfer functions, including functions to:
    establish a packet connection with a push engine in accordance with a secure protocol over the mobile communication network;
    send a request including authentication credentials of the mobile station to be registered for real-time or near real-time data transfer, via the secure protocol packet connection;
    responsive to the request, receive from the push engine, via the secure protocol packet connection, an acknowledgment message including a data transfer encoding type set to a chunked mode, thereby establishing the secure protocol packet connection as a persistent connection with the push engine;
    responsive to the request, receive from the push engine a response message indicating whether or not the authentication credentials of the mobile station are successfully validated; and
    after the successful validation of the authentication credentials of the mobile station, (1) send real-time or near real-time data, as a chunked message, over the persistent connection; and (2) send a heartbeat message from the mobile station to the push engine or receive a heartbeat message from the push engine to the mobile station, over the persistent connection, to determine whether the persistent connection is alive and available for real-time or near real- time data transfer in order to maintain the persistent connection.

11. The mobile station of claim 10, wherein:
    the execution of the programming by the processor causes the mobile station to perform a function to send the heartbeat message to the mobile station periodically over the persistent connection; and
    the period of sending heartbeat messages to the push engine is less than the period of receiving heartbeat messages from the push engine.

12. The mobile station of claim 10, wherein:
    the packet connection includes a Transmission Control Protocol (TCP) or Internet Protocol (IP);
    the secure protocol includes a secure socket layer (SSL) protocol; and
    the request includes a Hyper Text Transfer Protocol (HTTP) POST request.

13. The mobile station of claim 10, wherein the execution of the programming by the processor causes the mobile station to receive a push message from the push engine via the validated persistent connection over the mobile communication network, the push message comprising real-time or near real-time data received from a data source over a network.

14. The mobile station of claim 13, wherein the push message further comprises identification information of the one or more application programs running on the mobile station and receiving the real-time data.

15. The mobile station of claim 10, wherein the execution of the programming by the processor causes the mobile station to perform functions to:
send a registration request to the push engine for registering an application program on the mobile station for real-time or near real-time data transfer over the persistent connection; and
receive from the push engine a registration result message indicating whether or not the registration of the application program is successfully performed.

16. The mobile station of claim 10, wherein the execution of the programming by the processor causes the mobile station to perform functions to:
receive the heartbeat message from the push engine via the persistent connection over the mobile communication network; and
responsive to the heartbeat message, send an acknowledgment message to the push engine.

17. The mobile station of claim 10, wherein the execution of the programming by the processor causes the mobile station to perform a function to, responsive to the heartbeat message sent to the push engine, if an acknowledgment message is not received from the push engine, tear down the persistent connection with the push engine.

18. The mobile station of claim 10, wherein the execution of the programming by the processor causes the mobile station to perform a function to wait a predetermined period of time before establishing a persistent connection with the push engine, wherein the predetermined period of time is based on the number of connection attempts made by the mobile station.

19. A system comprising:
one or more computers, each computer comprising a processor and a network interface; and
a push controller and a push engine implemented on the one or more computers, wherein:
the push controller is configured to receive real-time or near real-time data from a data source on a network; and
the push engine is configured to: establish a packet connection with the mobile station using a secure protocol over the mobile communication network;
receive, from the mobile station, a request via the secure protocol packet connection, the request including authentication credentials of the mobile station to be registered for real-time or near real-time data transfer;
responsive to the request, send to the mobile station, via the secure protocol packet connection, an acknowledgment message including a data transfer encoding type set to a chunked mode, thereby establishing the secure protocol packet connection as a persistent connection with the mobile station;
send to the mobile station over the persistent connection a response message indicating whether or not the authentication credentials of the mobile station are successfully validated; and
after the successful validation of the authentication credentials of the mobile station, (1) send real-time or near real-time data, as a chunked message, over the persistent connection; and (2) send a heartbeat message to the mobile station or receive a heartbeat message from the mobile station, over the persistent connection, to determine whether the persistent connection is alive and available for real-time or near real-time data transfer in order to maintain the persistent connection.

20. The system of claim 19, wherein:
the push engine is configured to perform a function to receive the heartbeat message from the mobile station periodically over the persistent connection; and
the period of receiving heartbeat messages from the mobile station is less than the period of sending heartbeat messages to the mobile station.

* * * * *